United States Patent
Na et al.

(10) Patent No.: US 7,876,863 B2
(45) Date of Patent: Jan. 25, 2011

(54) METHOD AND SYSTEM FOR IMPROVING TIMING POSITION ESTIMATION IN WIRELESS COMMUNICATIONS NETWORKS

(75) Inventors: Yanxin Na, Plano, TX (US); Hang Jin, Plano, TX (US); Daniel Wee, Irving, TX (US); Bror Peterson, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 11/708,734

(22) Filed: Feb. 21, 2007

(65) Prior Publication Data

US 2008/0037508 A1 Feb. 14, 2008

Related U.S. Application Data

(60) Provisional application No. 60/836,715, filed on Aug. 10, 2006.

(51) Int. Cl.
*H03D 1/00* (2006.01)

(52) U.S. Cl. .............. 375/343; 375/362; 375/222; 375/260; 375/267; 375/344; 375/148

(58) Field of Classification Search ............. 370/503; 375/220, 316, 346, 347; 455/132, 504
See application file for complete search history.

(56) References Cited

U.S. PATENT DOCUMENTS

| 6,058,101 | A | 5/2000 | Huang et al. | |
|---|---|---|---|---|
| 7,415,059 | B2* | 8/2008 | Chadha et al. | 375/343 |
| 7,436,906 | B2* | 10/2008 | Goto | 375/316 |
| 2004/0120410 | A1 | 6/2004 | Priotti | |
| 2006/0250939 | A1* | 11/2006 | Wang et al. | 370/208 |
| 2009/0060076 | A1* | 3/2009 | Ma et al. | 375/260 |

OTHER PUBLICATIONS

International Search Report and Written Opinion cited in PCT/US2007/04710 dated May 30, 2008.

* cited by examiner

*Primary Examiner*—Shuwang Liu
*Assistant Examiner*—Dhaval Patel

(57) ABSTRACT

A method for determining timing positions in a wireless communications system comprises creating a time-domain timing detection window from a preamble of a receiving signal, generating a first vector of correlations between sampling points in the time-domain timing detection window and sampling points of a known preamble, identifying a pivot position from the largest correlation value of the first vector and generating second vectors based on the pivot position, generating a third vector comprising the largest elements of the second vectors; generating a fourth vector comprising sums of elements in the second vectors, generating fifth and sixth vectors comprising a sum of subsets of the third and fourth vectors, respectively, calculating a seventh vector using the fifth and sixth vectors according to a predetermined equation, and selecting an index of one element from the fifth and seventh vectors to be the timing position according to a predetermined rule.

24 Claims, 2 Drawing Sheets

METHOD AND SYSTEM FOR IMPROVING TIMING POSITION ESTIMATION IN WIRELESS COMMUNICATIONS NETWORKS

CROSS REFERENCE

The present application claims the benefit of U.S. Provisional Application Ser. 60/836,715, which was filed on Aug. 10, 2006.

BACKGROUND

Some wireless communications networks adopt orthogonal frequency-division multiplexing (OFDM) or orthogonal frequency-division multiple access (OFDMA) to take advantage of the immunity to multi-path fading and impulsive noise that these two methods provide. One of the characteristics of an OFDM or OFDMA system is that multiple carriers transmit information simultaneously. Due to this characteristic, an OFDM or OFDMA system is more sensitive to synchronization errors that occur in a preamble detection process, compared with a wireless communications network that employs a single carrier.

Synchronization errors in preamble detection include timing position errors and carrier frequency offset errors. The synchronization errors of the front-end of an OFDM receiver create a carrier frequency offset and a significant timing error that degrade the performance of an OFDM system. A carrier frequency offset results in a loss of orthogonality while a timing error could degrade the signal-noise-ratio (SNR) of the system. As a result, intra-symbol or inter-symbol interference occurs.

The algorithms for estimating a timing position and a frequency offset jointly are computationally intensive. To reduce the demand on the resources required for computation, the estimation of a timing position and that of a frequency offset are executed in separate stages. In general, the estimation of a timing position takes place before that of a carrier frequency offset.

The accuracy of timing position estimation has a major effect on the estimation of a carrier frequency offset. Specifically, when a timing position error is larger than the cyclic prefix (CP) length, OFDM or OFDMA no longer works correctly.

What is desired is a method and system with low complexity for improving timing position estimation and reducing timing position errors to be within −10 and +10 sampling points.

SUMMARY

A method for determining timing positions in a wireless communications system comprises creating a time-domain timing detection window from a preamble of a receiving signal, generating a first vector of correlations between sampling points in the time-domain timing detection window and sampling points of a known preamble, identifying a pivot position from the largest correlation value of the first vector and generating second vectors based on the pivot position, generating a third vector comprising the largest elements of the second vectors; generating a fourth vector comprising sums of elements in the second vectors, generating a fifth and sixth vectors comprising a sum of subsets of the third and fourth vectors, respectively, calculating a seventh vector using the fifth and sixth vectors according to a predetermined equation, and selecting an index of one element from the fifth and seventh vectors to be the timing position according to a predetermined rule.

The construction and method of operation of the invention, however, together with additional objects and advantages thereof, will be best understood from the following description of specific embodiments when read in connection with the accompanying drawings.

BRIEF DESCRIPTION OF THE DRAWINGS

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The method disclosed in the present invention describes a fine timing estimation algorithm. The method is easy to implement and can significantly improve the accuracy of timing position estimation. Although a WiMax wireless communications network is used to illustrate the system and method of the present invention, one having skills in the art would recognize that the present invention is applicable to the timing estimation process of any wireless communications network that uses unique preambles to facilitate the acquisition of radio signals. Orthogonal frequency division multiple access (OFDMA) and orthogonal frequency division multiplex (OFDM) are examples of such wireless communications networks.

The method disclosed in the present invention first creates a time-domain timing detection window. Correlations between the sampling points in the time-domain timing detection window and a portion of the sampling points of a known preamble are calculated and a vector of correlations is created. The position of the largest value in the vector of correlations is identified. Based on the position information, the time-domain timing detection window is divided into segments.

Two vectors—a sum_res_sum and a sum_res_max—are created from the sampling points in the time-domain timing detection window. A timing position is identified, based on the position of the largest element of the sum_res_sum vector or the sum_res_max vector.

Figure 1:
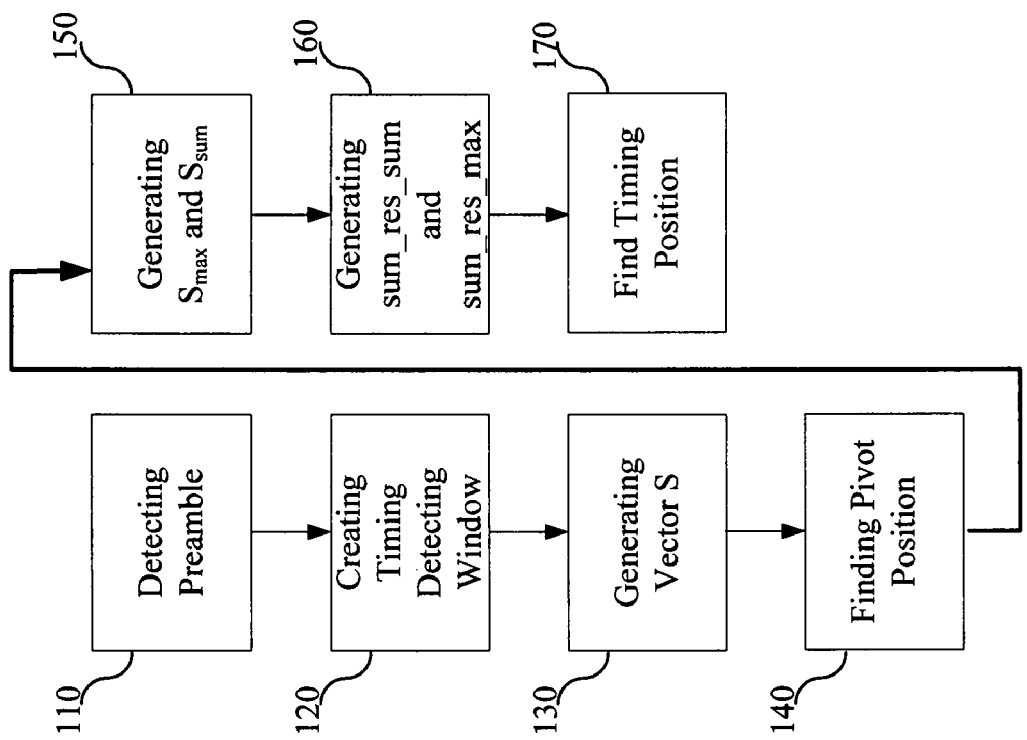
FIG. 1 is a flow diagram illustrating a method for obtaining a timing position of a receiving signal according to one embodiment of the present invention.

FIG. 1 is a flow diagram illustrating a method for obtaining a timing position of a receiving signal according to one embodiment of the present invention.

In step 110, a preamble is detected in a time-domain sampling window $W_{preamble\_det}$. A coarse estimate of a timing position of the preamble and a carrier frequency offset can be obtained using an algorithm that is known to a person with the skill of the art. The size of the time-domain sampling window $W_{preamble\_det}$ equals to the size of the FFT operation. Let L denote the size of the time-domain sampling window $W_{preamble\_det}$.

In step 120, a time-domain timing detection window $W_{timing\_dec}$ is created by adding $N_{inc\_range}$ sampling points to both sides of the time-domain sampling window $W_{preamble\_det}$. The size of $W_{timing\_dec}$ is equal to $L+2N_{inc\_range}$. The value of $N_{inc\_range}$ can be any number, but the typical value of $N_{inc\_range}$ is equal to either one or half of the FFT operation.

Let a vector R represent the sampling points in the time-domain timing detection window $W_{timing\_dec}$. Let a vector Preamble_TD represent the sampling points of a known preamble. The size of Preamble_TD is $L+N_{CP}$, where L is the size of the FFT operation and $N_{CP}$ is the size of the cyclic prefix (CP).

In step 130, the correlations between a subset of the sampling points in the vector R and a subset of the sampling points in the vector Preamble_TD are calculated according to the following equation:

$$s(k)=|R(k:k+N_{CP}+\lceil L/3 \rceil-1)(\text{Preamble\_TD}(1:N_{CP}+\lceil L/3 \rceil))^H|.$$

In the above equation, $\lceil \ldots \rceil$ is the ceiling operator; $(\ldots)^H$ is the Hermitian transpose operator; and $|\ldots|$ is the absolute value operator. Let the vector of the correlations with K elements be denoted as $S=[s(1), s(2), \ldots, s(K)]$, where $K=L+2N_{inc\_range}-N_{CP}-\lceil L/3 \rceil+1$. (The vector S is referred to as the first vector in the Claims section.)

In step 140, an element with the largest value in the vector S is identified and let $k_{max}$ denote the index of the element. A pivot position $k_1$ is obtained according to the following equation: $k_1=\text{mod}(k_{max},\lceil L/3 \rceil)$, where $\text{mod}(\ldots)$ operator produces the reminder of $k_{max}$ divided by $\lceil L/3 \rceil$.

In step 150, A series of $2d+1$ correlation values are taken from the vector S to form subsets, denoted as $\hat{S}(u)$, where $1 \leq u \leq U$ and $U=\text{floor}((K-k_1-1)/\lceil L/3 \rceil)+1$. The method is based on the following rule: $\hat{S}(u)=[s(k_1+(u-1)\lceil L/3 \rceil-d), \ldots, s(k_1+(u-1)\lceil L/3 \rceil+d)]$, where d is a predetermined positive integer value. (The vector $\hat{S}(u)$ is referred to as the second vector in the Claims section.)

Let $\hat{s}_{max}(u)$ denote the largest element of $\hat{S}(u)$. Let $\hat{s}_{sum}(u)$ be the sum of all elements of $\hat{S}(u)$. Two vectors are created: $\hat{S}_{max}=[\hat{s}_{max}(1), \hat{s}_{max}(2), \ldots, \hat{s}_{max}(U)]$ and $\hat{S}_{sum}=[\hat{s}_{sum}(1), \hat{s}_{sum}(2), \ldots, \hat{s}_{sum}(U)]$. (The vector $\hat{S}_{max}$ and the vector $\hat{S}_{sum}$ are referred to as the third factor and the fourth vector in the Claims section.)

In step 160, a vector sum_res_max is generated from $\hat{S}_{max}$ according to the following equation:

$$\text{sum\_res\_max}=[\hat{s}_{max}(1), \ldots, \hat{s}_{max}(U-2)]+[\hat{s}_{max}(2), \ldots, \hat{s}_{max}(U-1)]+[\hat{s}_{max}(3), \ldots, \hat{s}_{max}(U)]$$

In addition, a vector sum_res_sum is generated from $\hat{S}_{sum}$ according to the following equation:

$$\text{sum\_res\_sum}=[\hat{s}_{sum}(1), \ldots, \hat{s}_{sum}(U-2)]+[\hat{s}_{sum}(2), \ldots, \hat{s}_{sum}(U-1)]+[\hat{s}_{sum}(3), \ldots, \hat{s}_{sum}(U)]$$

The length of both vectors in step 160 equals $U-2$. (The vectors sum_res_max and sum_res_sum are referred to as the fifth vector and the sixth vector in the Claims section.)

Step 170 illustrates how to find a timing position. There are two alternative approaches to achieve the goal. In one approach, the index of the largest element of the vector sum_res_sum is denoted as $i_{max}$. Let tmp1 be the larger of the two values, sum_res_sum$(i_{max}-1)$ and sum_res_sum$(i_{max}+1)$. Two predetermined coefficients are chosen and denoted as $f_{11}$ and $f_{12}$. Temp1 is then compared with $f_{11}$*sum_res_sum$(i_{max})$. If temp1 is less than or equal to $f_{11}$*sum_res_sum$(i_{max})$, then $i_{max}$ is identified as the timing position. However, if temp1 is greater than $f_{11}$*sum_res_sum$(i_{max})$, then a new vector is generated according to the following equation: super_sum=sum_res_sum+$f_{12}$*sum_res_max. The index of the largest element of the vector super_sum is denoted as $j_{max}$, and it is identified as the timing position. (The vector super_sum is referred to as the seventh vector in the Claims section.)

According to the other approach, the index of the largest element of the vector sum_res_max is denoted as $i_{max}$. Let temp2 be the larger of the two values—sum_res_max$(i_{max}-1)$ and sum_res_max$(i_{max}+1)$. Two predetermined coefficients are chosen and denoted as $f_{21}$ and $f_{22}$. Temp2 is then compared with $f_{21}$*sum_res_max$(i_{max})$. If temp2 is less than or equal to $f_{21}$*sum_res_max$(i_{max})$, then $i_{max}$ is identified as the timing position. However, if temp2 is greater than $f_{21}$*sum_res_max$(i_{max})$, then a new vector is generated according to the following equation: super_sum=sum_res_max+$f_{22}$*sum_res_sum. The index of the largest element of the vector super_sum is denoted as $j_{max}$, and it is identified as the timing position.

Figure 2:
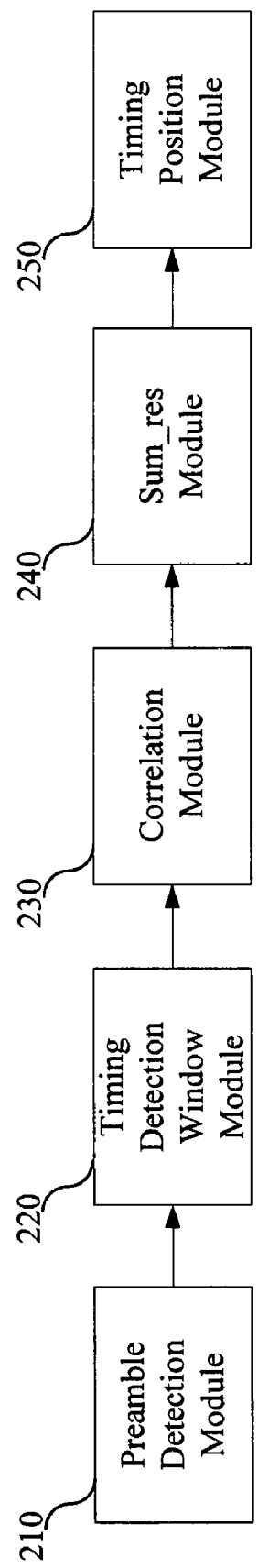
FIG. 2 illustrates a system that employs the method disclosed in the present invention.

FIG. 2 illustrates a system exemplifying the method disclosed in the present invention. The system 200 includes five modules: a preamble detection module 210, a timing detection window module 220, a correlation module 230, a sum_res module 240, and a timing position module 250.

The preamble detection module 210 detects the position of a preamble and determines a coarse timing position and a sub-carrier frequency offset. The timing detection window module 220 creates a time-domain timing detection window using a time-domain sampling window. The time-domain timing detection window $W_{timing\_dec}$ is created by adding $N_{inc\_range}$ sampling points to both sides of the time-domain sampling window $W_{preamble\_det}$. The size of the time-domain sampling window $W_{preamble\_det}$ equals to the size of the FFT operation, denoted as L. The size of $W_{timing\_dec}$ is equal to $L+2N_{inc\_range}$. The value of $N_{inc\_range}$ can be any number, but the typical value of $N_{inc\_range}$ is equal to either one or half of the size of the FFT operation.

The correlation module 230 generates a correlation vector comprising of correlations between a subset of the time-domain timing detection window and a subset of the sampling points of a known preamble. A correlation vector with K elements is denoted as $S=[s(1), s(2), \ldots, s(K)]$, where $K=L+2N_{inc\_range}-N_{CP}-\lceil L/3 \rceil+1$.

The correlation module 230 identifies the largest value in the vector S. Let $k_{max}$ denote the index of the element. A pivot position $k_1$ is obtained according to the following equation: $k_1=\text{mod}(k_{max},\lceil L/3 \rceil)$, where $\text{mod}(\ldots)$ operator produces the reminder of $k_{max}$ divided by $\lceil L/3 \rceil$.

Any subset of the vector S is denoted as $\hat{S}(u)$, where $1 \leq u \leq U$, and $U=\text{floor}((K-k_1-1)/\lceil L/3 \rceil)+1$. Let d be a predetermined integer, and $2d+1$ correlation values are taken from the vector S to form a series of subsets $\hat{S}(u)$. The method to form subsets $\hat{S}(u)$ is based on the following equation:

$$\hat{S}(u)=[s(k_1+(u-1)\lceil L/3 \rceil-d), \ldots, s(k_1+(u-1)\lceil L/3 \rceil+d)].$$

The sum_res module 240 creates two vectors, and they are: $\hat{S}_{max}=[\hat{s}_{max}(1), \hat{s}_{max}(2), \ldots, \hat{s}_{max}(U)]$ and $\hat{S}_{sum}=[\hat{s}_{sum}(1), \hat{s}_{sum}(2), \ldots, \hat{s}_{sum}(U)]$, where $\hat{s}_{max}(u)$ denotes the largest element of $\hat{S}(u)$ and $\hat{s}(u)$ is the sum of all elements of $\hat{S}(u)$. Subsequently, two vectors—sum_res_sum and sum_res_max—are created from $\hat{S}_{max}(u)$ and $\hat{S}_{sum}(u)$, respectively, where sum_res_max=$[\hat{s}_{max}(1), \ldots, \hat{s}_{max}(U-2)]+[\hat{s}_{max}(2), \ldots, \hat{s}_{max}(U-1)]+[\hat{s}_{max}(3), \ldots, \hat{s}_{max}(U)]$ and sum_ res_sum=[$\hat{s}_{sum}(1), \ldots, \hat{s}_{sum}(U-2)$]+[$\hat{s}_{sum}(2), \ldots, \hat{s}_{sum}(U-1)$]+[$\hat{s}_{sum}(3), \ldots, \hat{s}_{sum}(U)$]. The sum_res module also creates a vector super_sum according to the following equation: super_sum=sum_res_sum+$f_{12}$*sum_res_max, where $f_{12}$ is a predetermined value.

The timing position module 250 identifies the largest element of the vectors sum_res_sum and super_sum. The index of the largest element of the vector sum_res_sum is denoted as $i_{max}$, and the index of the largest element of the vector super_sum is denoted as $j_{max}$. The timing position module 250 compares the larger of the two values—sum_res_sum($i_{max}$−1) and sum_res_sum($i_{max}$+1)—with $f_{11}$*sum_res_sum($i_{max}$), where $f_{11}$, is a predetermined value. If the larger of the two values—sum_res_sum($i_{max}$−1) and sum_res_sum($i_{max}$+1)— is greater than $f_{11}$*sum_res_sum($i_{max}$), then $j_{max}$ is the timing position; otherwise, $i_{max}$ is the timing position.

By adopting the method disclosed in the present invention, the timing error can be narrowed down to a value between −1 and 1 in an additive white Gaussian noise (AWGN) channel or a value between −5 and 5 in an ITU multi-path channel.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
    at a communications device, receiving a signal wirelessly transmitted by another communications device;
    creating a time-domain timing detection window from a preamble of the signal;
    generating a first vector comprising correlation values representing correlation between a first plurality of sampling points in the time-domain timing detection window and a second plurality of sampling points of a known preamble;
    identifying a pivot position from a largest correlation value of the first vector and generating three or more second vectors based on the pivot position;
    generating a third vector comprising relatively large elements of the second vectors;
    generating a fourth vector derived from sums of elements of the second vectors;
    generating a fifth and a sixth vector derived from a sum of subsets of the third and fourth vectors, respectively;
    selecting an index, according to a predetermined rule, of one element from at least one of the fifth and sixth vectors to be a timing position for the signal; and
    synchronizing the communications device with the signal using the timing position.

2. The method of claim 1, wherein creating the time-domain timing detection window further comprises adding a predetermined number of sampling points on both sides of the time-domain sampling window.

3. The method of claim 1, wherein generating the first vector comprises calculating the following equation:

$$s(k)=|R(k:k+N_{CP}+\lceil L/3 \rceil-1)(\text{Preamble\_TD}(1:N_{CP}+\lceil L/3 \rceil))^H|,$$

where a vector $R(k:k+N_{CP}+\lceil L/3 \rceil-1)$ represents a subset of a predetermined number of sampling points in the time-domain timing detection window; a vector Preamble_TD $(1:N_{CP}+\lceil L/3 \rceil)$ represents a subset of a predetermined number of sampling points of a known preamble in a time domain sampling window; $(\ldots)^H$ is the Hermitian transpose operator; and wherein (a:b) stands for a series of elements from the a-th element to the b-th element; and $|\ldots|$ is the absolute value operator.

4. The method of claim 1, wherein identifying comprises identifying the pivot position as a remainder of the index of a largest correlation value element of the first vector divided by a predetermined value.

5. The method of claim 1, wherein generating each of the second vectors comprises generating each second vector as a subset of the first vector comprised of a predetermined number of correlation values taken from the first vector based on the pivot position.

6. The method of claim 1, wherein selecting comprises selecting as the index a largest element of the fifth vector as the timing position if a largest neighboring element of the largest element of the fifth vector is less than or equal to a product of the largest element of the fifth vector and a predetermined value.

7. The method of claim 6, wherein if the largest neighboring element of the largest element of the fifth vector is not less than or equal to a product of the largest element of the fifth vector and the predetermined value, further comprising generating a seventh vector using the fifth and sixth vectors according to a predetermined equation, and wherein selecting comprises selecting an index of a largest element of the seventh vector as the timing position.

8. The method of claim 1, wherein selecting comprises selecting as the index a largest element of the sixth vector as the timing position if a largest neighboring element of the largest element of the sixth vector is less than or equal to a product of the largest element of the sixth vector and a predetermined value.

9. The method of claim 8, wherein if the largest neighboring element of the largest element of the sixth vector is not less than or equal to a product of the largest element of the sixth vector and the predetermined value, further comprising generating a seventh vector using the fifth and sixth vectors according to a predetermined equation, and wherein selecting comprises selecting an index of a largest element of the seventh vector as the timing position.

10. A system comprising a communication device, receiving a signal wirelessly transmitted by another communication device, the communication device further comprising:
    a preamble detection module configured to determine a coarse timing position and a sub-carrier frequency offset with respect to the received wireless signal;
    a timing detection window module configured to create a time-domain timing detection window using a time-domain sampling window;
    a correlation module configured to generate a first vector comprising correlation values representing correlation between sampling points in the time-domain timing detection window and a subset of sampling points of a known preamble, to obtain a pivot position of the first vector, and to generate three or more second vectors from the pivot position;

a sum module configured to create a third and fourth vectors based on three or more second vectors, to create a fifth vector based on the third vector, and to create a sixth vector based on the fourth vector; and a timing position module configured to determine a timing position of the received wireless signal based on at least one element from at least one of the fifth and sixth vectors.

11. The system of claim 10, wherein the timing detection window module is configured to create the time-domain timing detection window by adding a predetermined number of sampling points on both sides of the time-domain sampling window.

12. The system of claim 10, wherein the correlation module is configured to calculate the correlation values between the sampling points in the time-domain timing detection window and the sampling points of the known preamble according to the following equation:

$$s(k)=|R(k:k+N_{CP}+\lceil L/3\rceil-1)(\text{Preamble\_TD}(1:N_{CP}+\lceil L/3\rceil))^H|,$$

where a vector $R(k:k+N_{CP}+\lceil L/3\rceil-1)$ represents a subset of a predetermined number of sampling points in the time-domain timing detection window; a vector $\text{Preamble\_TD}(1:N_{CP}+\lceil L/3\rceil)$ represents a subset of a predetermined number of sampling points of the known preamble in a time domain sampling window; $(\ldots)^H$ is the Hermitian transpose operator; and $|\ldots|$ is the absolute value operator.

13. The system of claim 10, wherein the correlation module is configured to identify a largest correlation value between the sampling points in the time-domain timing detection window and the sampling points of the known preamble.

14. The system of claim 13, wherein the correlation module is configured to select a pivot position by obtaining a remainder of the index of the largest correlation value divided by a predetermined value.

15. The system of claim 10, wherein the correlation module is configured to generate the second vectors as a subset of the first vector and comprising correlation values taken from the first vector based on the pivot position.

16. The system of claim 10, wherein the sum module is configured to generate a third vector comprising largest elements of the three or more second vectors and a fourth vector comprising a sum of the elements of the three or more second vectors.

17. The system of claim 10, wherein the timing position module is configured to determine an index of a largest element of the fifth vector as the timing position if a largest neighboring element of the largest element of the fifth vector is less than or equal to a product of the largest element of the fifth vector and a predetermined value.

18. The system of claim 17, wherein if the largest neighboring element of the largest element of the fifth vector is not less than or equal to a product of the largest element of the fifth vector and the predetermined value, the timing position module is further configured to generate a seventh vector using the fifth and sixth vectors according to a predetermined equation and to select an index of a largest element of the seventh vector as the timing position.

19. The system of claim 10, wherein the timing position module is configured to determine an index of a largest element of the sixth vector as the timing position if a largest neighboring element of the largest element of the sixth vector is less than or equal to a product of the largest element of the sixth vector and a predetermined value.

20. The system of claim 19, wherein if the largest neighboring element of the largest element of the sixth vector is not less than or equal to a product of the largest element of the sixth vector and the predetermined value, the timing position module is further configured to generate a seventh vector using the fifth and sixth vectors according to a predetermined equation and to determine an index of a largest element of the seventh vector as the timing position.

21. A method comprising:
at a communications device, receiving a signal wirelessly transmitted by another communications device;
creating a time-domain timing detection window from a preamble portion of the signal;
generating a first vector comprising correlation values representing correlation between a first plurality of sampling points in the time-domain timing detection window and a second plurality of sampling points of a known preamble;
identifying a pivot position of the first vector from a largest correlation value of the first vector, wherein identifying the pivot position comprises computing $k1=\text{mod}(k_{max}, L/3)$, where $\text{mod}(\ldots)$ is an operator that produces a remainder of $k_{max}$ divided by $L/3$, where L is a size of the time-domain timing detection window and $k_{max}$ is an index of the largest correlation value in the first vector;
deriving a timing position for the signal based on the pivot position of the first vector; and
synchronizing the communications device with the signal using the timing position.

22. The method of claim 21, wherein creating the time-domain timing detection window further comprises adding a predetermined number of sampling points on both sides of the time-domain sampling window.

23. The method of claim 21, wherein identifying comprises identifying the pivot position as a remainder of the index of a largest correlation value element of the first vector divided by a predetermined value.

24. The method of claim 21, and further comprising generating a plurality of second vectors each from subsets of the first vector; generating a third vector comprising relatively large elements of the second vectors; generating a fourth vector derived from sums of elements of the second vectors; generating a fifth and a sixth vector derived from a sum of subsets of the third and fourth vectors, respectively; and selecting an index, according to a predetermined rule, of one element from at least one of the fifth and sixth vectors to be the timing position.

* * * * *